May 28, 1968   W. C. FAHIE   3,385,320
FLUID FLOW CONTROL VALVES
Filed Aug. 10, 1965   9 Sheets-Sheet 4

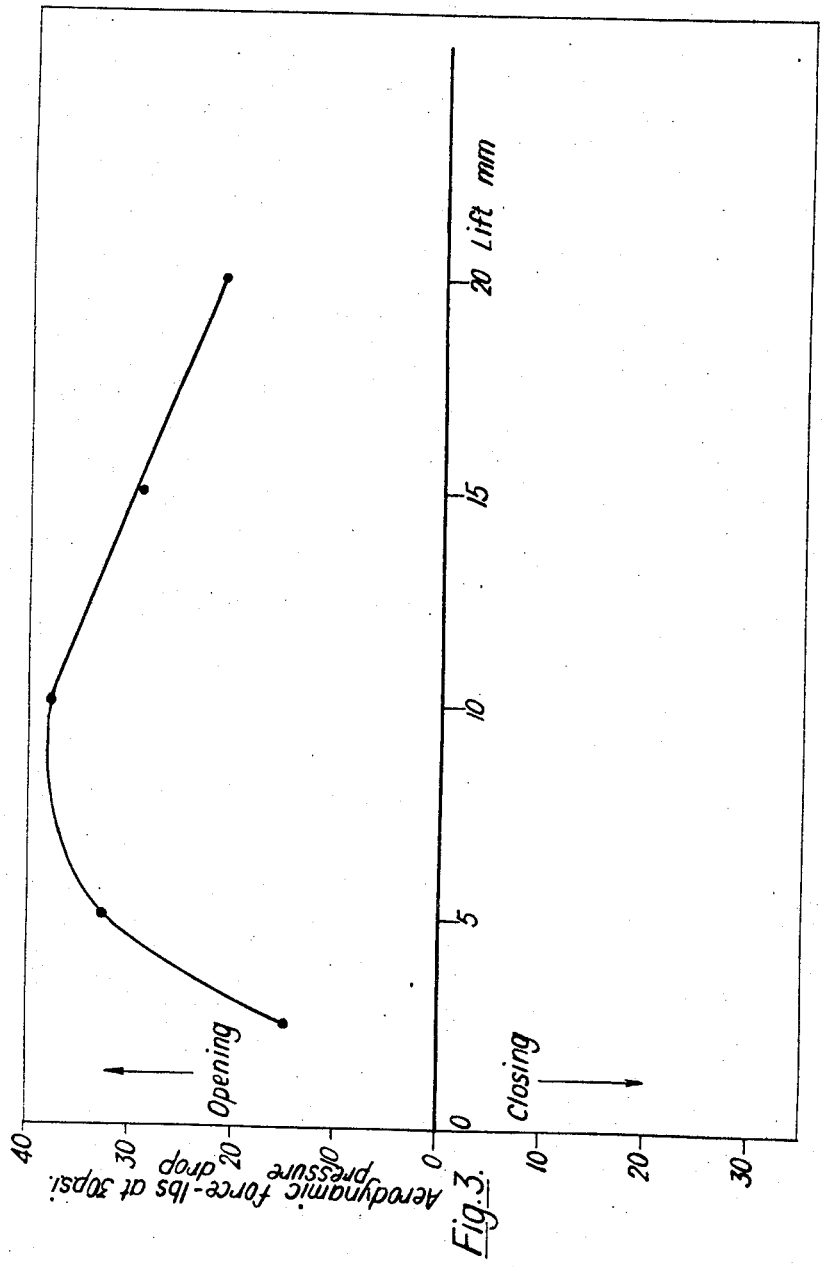

Inventor
William Cusack Fahie
By Dowell Dowell
Attorneys

May 28, 1968  W. C. FAHIE  3,385,320
FLUID FLOW CONTROL VALVES
Filed Aug. 10, 1965  9 Sheets-Sheet 9

Inventor
William Cusack Fahie
By Lowell H. McDowell
Attorneys

United States Patent Office 3,385,320
Patented May 28, 1968

3,385,320
FLUID FLOW CONTROL VALVES
William Cusack Fahie, Ipswich, England, assignor to Reavell-Fahie Limited, Ipswich, England
Filed Aug. 10, 1965, Ser. No. 478,703
Claims priority, application Great Britain, Aug. 10, 1964, 32,489/64
3 Claims. (Cl. 137—625.34)

ABSTRACT OF THE DISCLOSURE

The invention is an improvement in double beat valves and its aim is to produce a valve which can be moved between its open and closed positions by a power actuator with very small effort, and furthermore which can be held by the actuator at partly open positions. For this, the valve needs to be in both hydrostatic and hydrodynamic balance. Hydrostatic balance alone in valves has been quite common in the prior art but so far no one has ever achieved both hydrostatic and hydrodynamic balance. Applicant's invention teaches the worker the way to achieve hydrodynamic balance but having been so taught the worker can only obtain the result after some simple experiment because it involves primarily choosing the valve plug height, the actual height needed for each plug varying with each different set of valve parameters.

---

Figure 1:
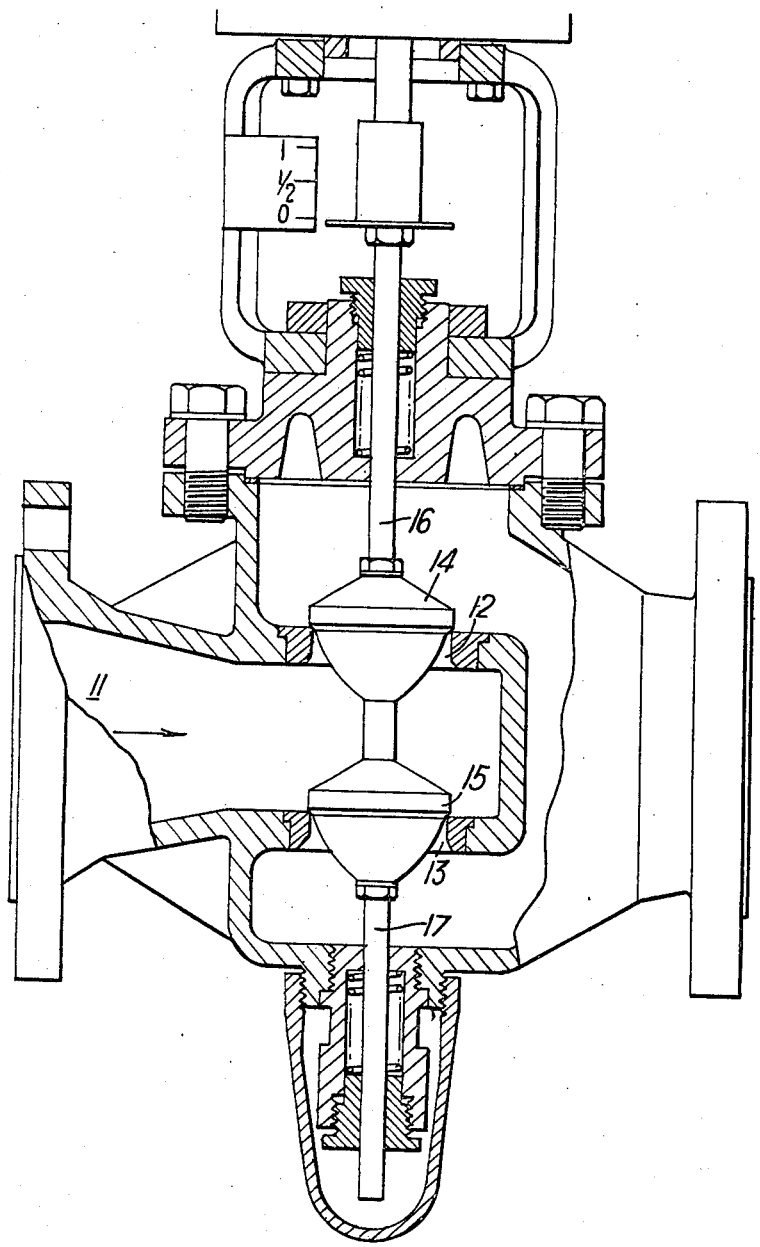

This invention relates to fluid flow control valves.

In many modern applications of control valves there is a need for a type of valve that requires only a comparatively small operating force, even when it is regulating flow of a fluid at fairly high pressure. Thus, the forces and stroke energies of electromagnets or solenoid valve actuators are limited by the requirement not to overheat the windings; and there are various other ways of opening and closing valves, for example using air motors or cylinders of limited size, float level operation, and operation by condition-responsive sensors such as thermostats, which give only small valve-operating forces if the actuating device is coupled directly to the valve. Of course, in many cases some form of relay is employed intermediate the primary actuator and the valve to step up the force available, but this materially increases the cost, complexity and bulk of a control system.

It is therefore an object of the invention to achieve a valve which will give precise fluid flow control, in spite of the fact that the input force available to control it is low.

According to the present invention, in a fluid flow control valve of the double beat type the configurations, and in particular the heights (i.e., the dimensions in the direction of lift), of the two valve plugs are so chosen, both absolutely and in regard to their mutual relationship, as to give optimum or substantially balanced hydrodynamic or aerodynamic forces thereon over a range of valve lift.

A double beat valve is one possessing two valve plugs cooperating respectively, with two valve seats. In a typical arrangement the two valve plugs may be carried in tandem on a common valve rod so as to make opening and closing movements in unison, the two valve seat apertures being mutually aligned and lying in two parallel paths for flow of fluid through the valve chamber.

The fact that a valve requires a big force to operate it is due, in large measure, to fluid pressure unbalance on the movable valve member. This may arise from both hydrostatic and hydrodynamic unbalance, which terms are intended to include also aerostatic and aerodynamic unbalance. Hydrostatic unbalance is the presence of a net force on the valve stem when the valve is in operation, i.e., contains pressure fluid, but is closed so that no actual flow is passing through it. Hydrodynamic unbalance is the presence of a net force on the valve stem when the valve is partially or fully open and flow through the valve is taking place. There is also residual stem force which is due to friction and the dead weight of the movable valve member and associated parts.

Whereas hydrostatic unbalance can be dealt with, in a double beat valve in which one valve plug lifts with the flow and the other against it, by making the seating areas of the two valve plugs the same, and by providing a tail rod equal in cross sectional area to the valve stem, hydrodynamic unbalance is not so readily overcome. We have discovered, however, that the problem can be met by appropriate selection of the heights of the valve plugs.

Figure 10:
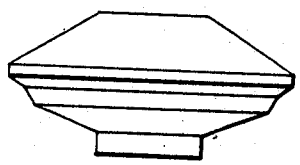
Figure 11:
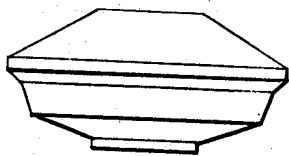
Figure 13:
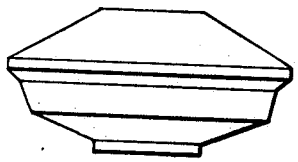
Figure 14:
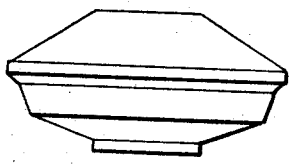
Figure 16:
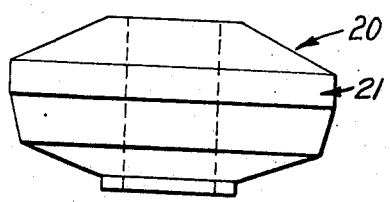
Figure 12:
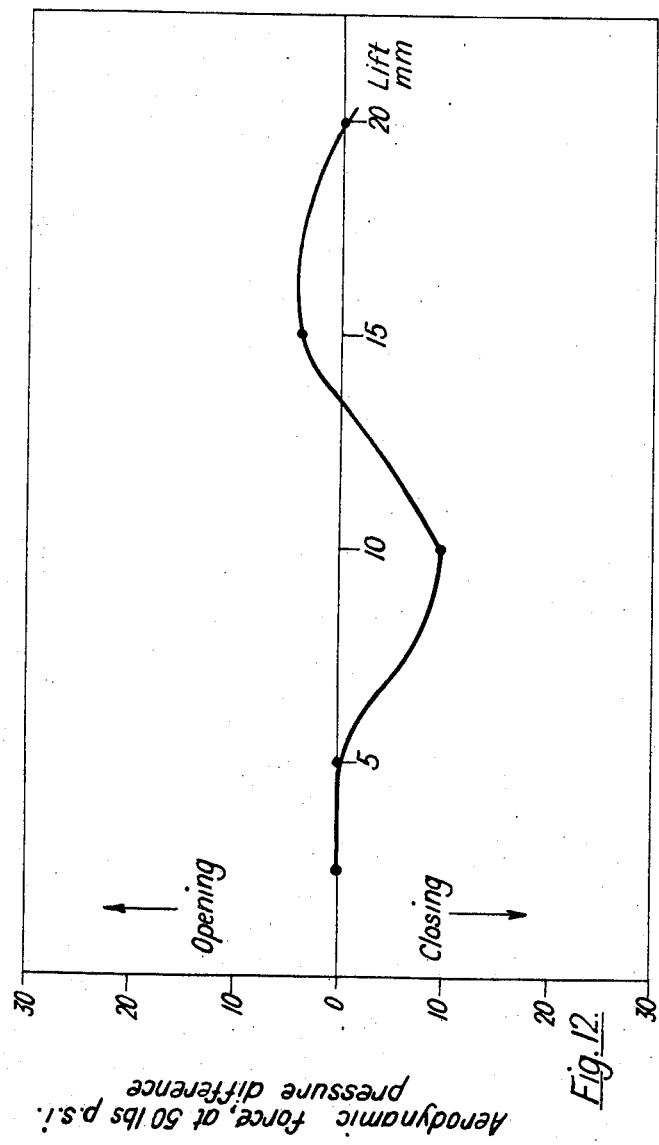
Figure 15:
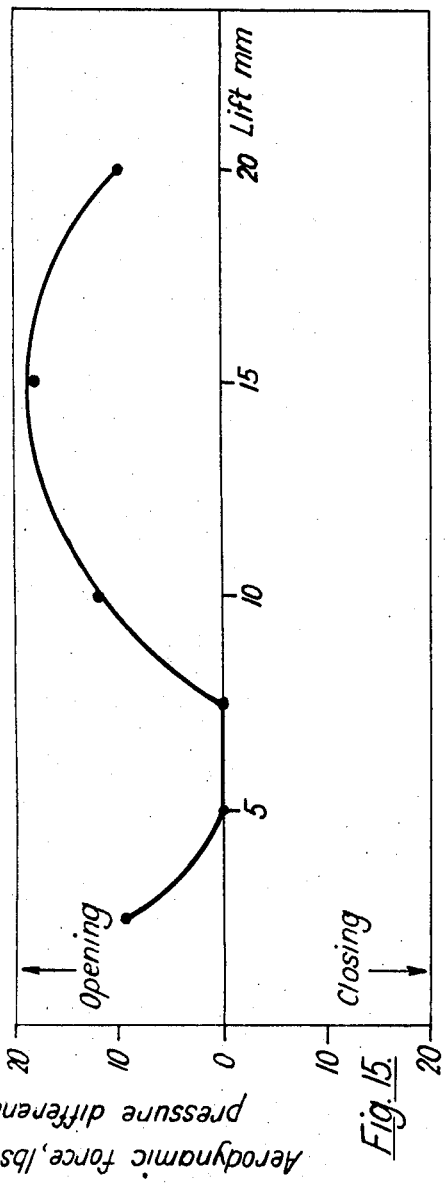

The nature of the invention may be better understood from the following discussion given with reference to the accompanying drawings, in which:

FIGURE 1 shows a double beat valve which is in hydrostatic balance but not in hydrodynamic balance, FIGURES 2, 4, 5 and 6 show different designs of valve plug, FIGURES 3, 7, 8 and 9 are plots of force versus lift for the valve plugs of FIGURES 2, 4, 5 and 6, respectively, FIGURES 10 and 11 show top and bottom valve plugs designed for use together, FIGURE 12 is a plot of force versus lift for the valve plugs of FIGURES 10 and 11, FIGURES 13 and 14 show further top and bottom valve plug designs for use together, FIGURE 15 is a plot of force versus lift for the valve plugs of FIGURES 13 and 14, and FIGURE 16 shows a valve plug with a cylindrical seating surface.

FIGURE 1 of the drawings shows a double beat valve in hydrostatic balance. The flow of pressure fluid through the valve entry 11 divides to flow equally through upper and lower valve seat openings 12, 13. Two valve plugs 14, 15 on a common valve stem 16 cooperate, respectively, with the upper and lower valve seats. It will be observed that the upper valve plug 14 opens with the flow and the lower plug 15 against the flow, and since the two valve seat areas are the same the static pressure fluid forces on the plugs are balanced when the valve is closed. The area of the valve stem 16 is taken into account by providing an oppositely-extending tail rod 17 of the same cross-sectional area.

Figure 2:
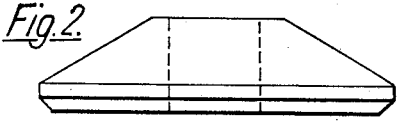
Figure 4:
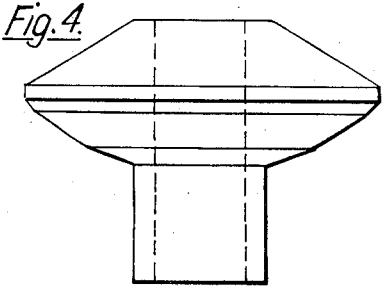
Figure 5:
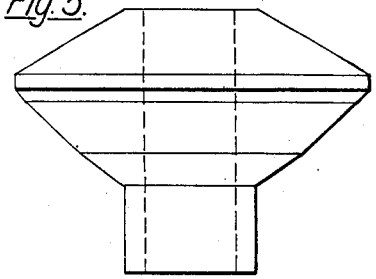
Figure 6:
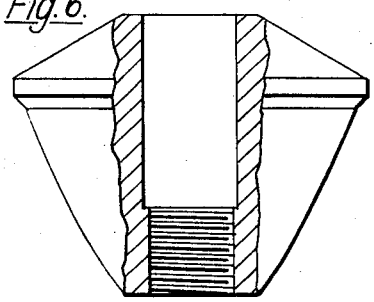
Figure 7:
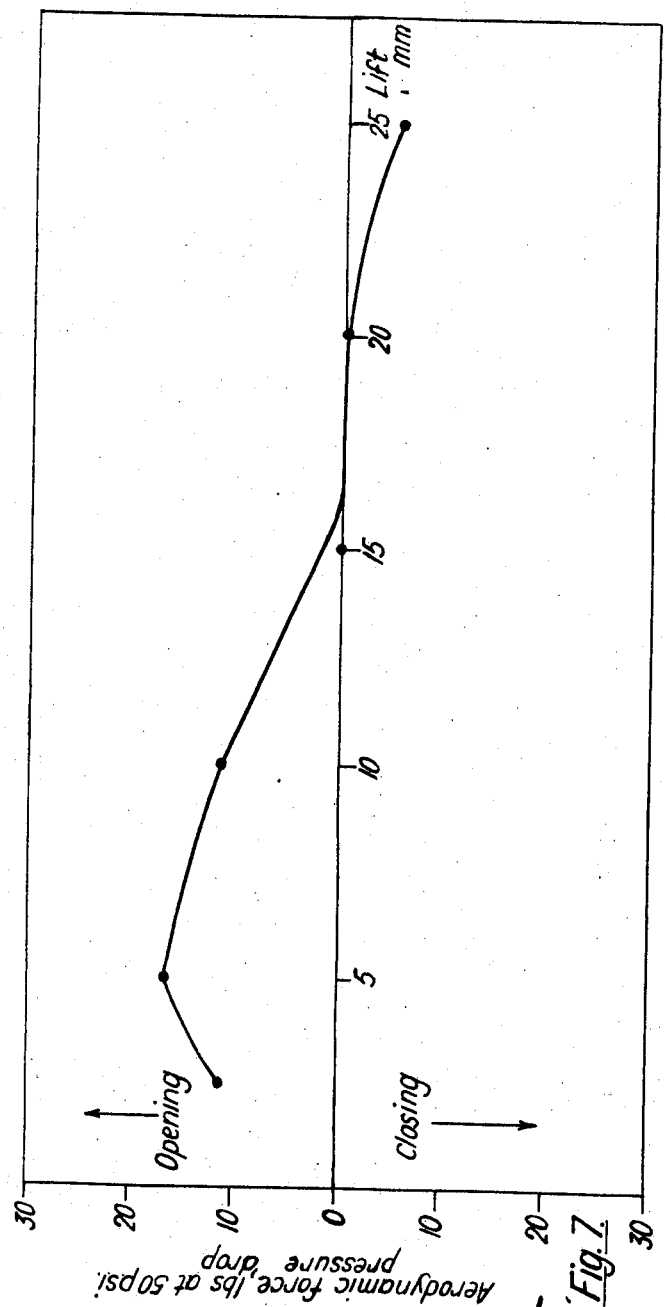
Figure 8:
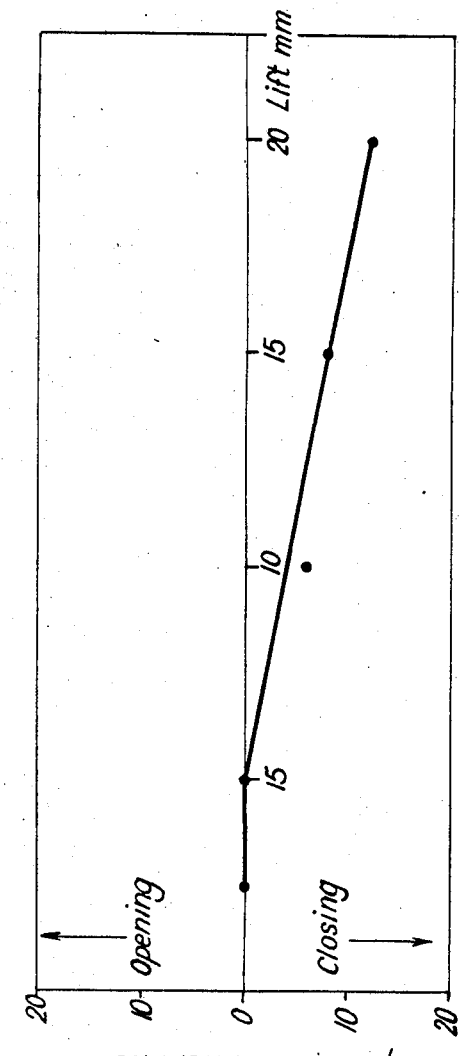
Figure 9:
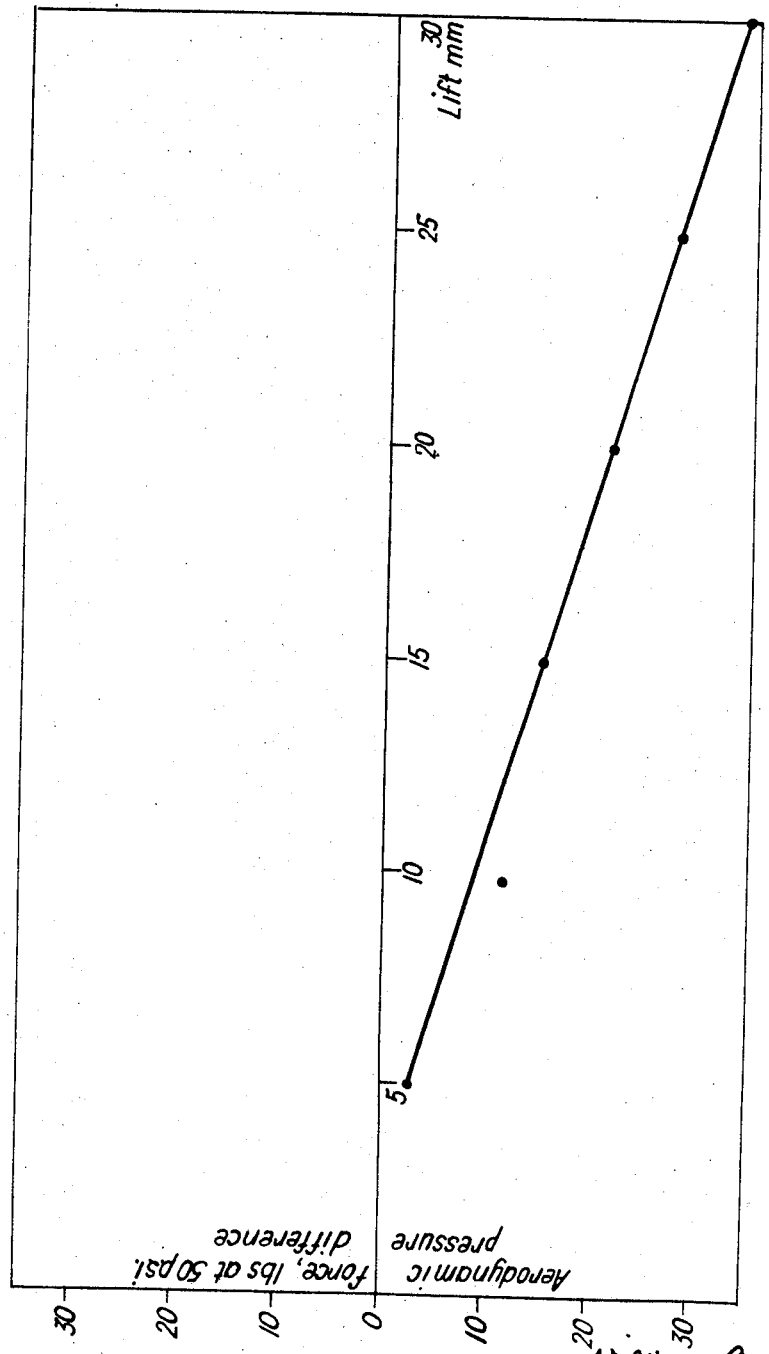

Considering again now hydrodynamic (or aerodynamic) balance, we have found that the hydrodynamic forces on the valve plugs vary significantly, and in fact change direction, with variation in plug height. To illustrate this there are included in the accompanying drawings a number of graph plots of fluid pressure force on the plug assembly versus valve lift, i.e., displacement of the plug assembly from the closed position. If identical flat plugs each of the form shown in FIGURE 2 are used then the force versus lift plot is as in FIGURE 3, where it will be seen that although there is variation will amount of lift the force is always in the positive or opening direction. If now the height of both valve plugs is progressively increased, as in FIGURES 4, 5 and 6, the opening force diminishes and ultimately reverses to become a closing force, as can be seen from the plots in FIGURES 7, 8 and 9 which relate to the valve plugs of FIGURES 4, 5 and 6, respectively.

It is therefore apparent that, for any given set of body and seat dimensions, and at a given lift, there is, in the ordinary case, a particular plug height at which the stem forces disappear. This makes it possible, by simple experiments in particular cases, to determine what height of plug will give the optimum performance.

It is not, however, necessary that the two plugs should be of the same configuration. FIGURES 10 and 11 show top and bottom plugs of different form, resulting in the force versus lift plot shown in FIGURE 12. This gives small hydrodynamic forces in the closing direction at low lifts, small opening forces at intermediate lifts, and negligible force at high lift. By contrast, two more shapes for the top and bottom plugs, shown in FIGURES 13 and 14, give a quite different force characteristic as seen in FIGURE 15. Therefore not only is it possible, by employing the technique of this invention, to reduce the hydrodynamic forces to a minimum, but also one can create desired force characteristics for particular valve applications, by appropriate choice of the forms and dimensions of the plugs.

It is evident that the plug forms of the preceding examples are such that the plug assembly cannot be made out of a single piece because it could not then be placed in position through either valve seat. If this is considered to be a disadvantage it can be overcome by using a plug form in which the seating surface is cylindrical instead of tapering. An example is shown in FIGURE 16 where the plug 20 has a cylindrical seating surface 21. It has been found experimentally that such a form does not give rise to an appreciable increase in the leakage rate when the valve is closed.

I claim:

1. A fluid flow control valve of the double beat type comprising a fluid chamber from which the fluid flows out in opposite directions through upper and lower coaxial valve seat openings of equal area, and upper and lower lifting valve plugs of equal maximum diameter closing respectively the upper and lower valve seat openings, and a common valve stem carrying the said two valve plugs and extending with uniform diameter both above the upper valve plug into a first valve guide means and below the lower valve plug into a second valve guide means, whereby the valve is in hydrostatic balance, and wherein the contours and the heights of the two valve plugs plugs measured in the direction of lifting movement thereof are individually chosen in a mutual relationship that gives substantially balanced hydrodynamic forces thereon over the working range of valve lift.

2. A valve according to claim 1, wherein the two valve plugs are of different heights.

3. A valve according to claim 1, wherein the valve plugs have cylindrical seating surfaces.

References Cited

UNITED STATES PATENTS

| 1,275,831 | 8/1918 | Barrett | 137—625.36 |
| 2,880,748 | 4/1959 | Elsey | 137—625.36 |
| 3,150,687 | 9/1964 | Kalle | 251—282 |

FOREIGN PATENTS

| 186,934 | 9/1956 | Austria. |
| 1,060,865 | 11/1953 | France. |
| 252,191 | 5/1926 | Great Britain. |

M. CARY NELSON, *Primary Examiner.*

A. ROSENTHAL, *Assistant Examiner.*